United States Patent
Jung et al.

(10) Patent No.: US 8,341,522 B2
(45) Date of Patent: Dec. 25, 2012

(54) ENHANCED CONTEXTUAL USER ASSISTANCE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 829 days.

(21) Appl. No.: 10/974,561

(22) Filed: Oct. 27, 2004

(65) Prior Publication Data

US 2006/0086781 A1   Apr. 27, 2006

(51) Int. Cl.
*G06F 3/00* (2006.01)
(52) U.S. Cl. .................................. 715/705; 715/709
(58) Field of Classification Search .............. 715/709, 715/711, 705, 708
See application file for complete search history.

(56) References Cited

U.S. PATENT DOCUMENTS

| | | | |
|---|---|---|---|
| 5,287,102 A | 2/1994 | McKiel, Jr. | |
| 5,311,434 A | 5/1994 | Tamai | |
| 5,388,251 A * | 2/1995 | Makino et al. | 714/57 |
| 5,812,977 A * | 9/1998 | Douglas | 704/275 |
| 5,825,355 A | 10/1998 | Palmer et al. | |
| 5,877,757 A | 3/1999 | Baldwin et al. | |
| 5,887,171 A | 3/1999 | Tada et al. | |
| 5,923,325 A | 7/1999 | Barber et al. | |
| 5,938,721 A | 8/1999 | Dussell et al. | |
| 5,965,858 A | 10/1999 | Suzuki et al. | |
| 5,985,858 A | 11/1999 | Miyata et al. | |
| 5,991,739 A | 11/1999 | Cupps et al. | |
| 6,107,938 A | 8/2000 | Du et al. | |
| 6,112,181 A | 8/2000 | Shear et al. | |
| 6,230,170 B1 | 5/2001 | Zellweger et al. | |
| 6,256,378 B1 | 7/2001 | Iggulden et al. | |
| 6,385,541 B1 | 5/2002 | Blumberg et al. | |
| 6,462,660 B1 | 10/2002 | Cannon et al. | |

(Continued)

FOREIGN PATENT DOCUMENTS

JP     2002-123349     4/2002

(Continued)

OTHER PUBLICATIONS

Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch01lev1sec4; printed on Mar. 13, 2008.

(Continued)

*Primary Examiner* — Omar Abdul-Ali
(74) *Attorney, Agent, or Firm* — Suiter Swantz pc llo

(57) ABSTRACT

In an approach, an exemplary method includes receiving a query related to an electronic device through a first user interface associated with the electronic device, sensing a context of the electronic device, and providing an assistance correlating to the query and the sensed context through a second user interface associated with the electronic device. In another approach, an exemplary system includes an electronic device having a context sensor, a first and a second user interface, and instructions. The instructions cause the electronic device to receive a query related to the electronic device through a first user interface associated with the electronic device, receive a context of the electronic device from the context sensor, and provide an assistance corresponding to the query and the context of the electronic device through a second user interface associated with the electronic device.

32 Claims, 10 Drawing Sheets

U.S. PATENT DOCUMENTS

| | | | | |
|---|---|---|---|---|
| 6,466,899 | B1* | 10/2002 | Yano et al. | 704/1 |
| 6,542,814 | B2 | 4/2003 | Polidi et al. | |
| 6,584,496 | B1 | 6/2003 | Ludtke | |
| 6,650,902 | B1 | 11/2003 | Richton | |
| 6,651,053 | B1 | 11/2003 | Rothschild | |
| 6,788,313 | B1 | 9/2004 | Heil | |
| 6,799,205 | B2 | 9/2004 | Ludtke | |
| 6,816,881 | B1 | 11/2004 | Mohindra et al. | |
| 6,823,188 | B1 | 11/2004 | Stern | |
| 6,829,668 | B2 | 12/2004 | Keskar et al. | |
| 6,874,037 | B1 | 3/2005 | Abram et al. | |
| 6,882,712 | B1 | 4/2005 | Iggulden et al. | |
| 6,892,936 | B2 | 5/2005 | Riggert et al. | |
| 6,920,612 | B2 | 7/2005 | Makinen | |
| 6,967,576 | B2 | 11/2005 | Hayes et al. | |
| 7,043,691 | B1 | 5/2006 | Kwon et al. | |
| 7,055,737 | B1 | 6/2006 | Tobin et al. | |
| 7,082,365 | B2* | 7/2006 | Sheha et al. | 701/209 |
| 7,129,927 | B2 | 10/2006 | Mattsson | |
| 7,202,783 | B2 | 4/2007 | Want et al. | |
| 7,212,827 | B1 | 5/2007 | Veschl | |
| 7,277,884 | B2* | 10/2007 | Vadai et al. | 707/3 |
| 7,446,655 | B2 | 11/2008 | Jha et al. | |
| 7,457,628 | B2 | 11/2008 | Blumberg et al. | |
| 7,490,763 | B2 | 2/2009 | Keohane et al. | |
| 7,798,401 | B2 | 9/2010 | Jung et al. | |
| 2001/0055976 | A1 | 12/2001 | Crouch et al. | |
| 2002/0007225 | A1 | 1/2002 | Costello et al. | |
| 2002/0023144 | A1 | 2/2002 | Linyard et al. | |
| 2002/0032497 | A1 | 3/2002 | Jorgenson et al. | |
| 2002/0062280 | A1 | 5/2002 | Zachariassen et al. | |
| 2002/0069030 | A1 | 6/2002 | Xydis | |
| 2002/0075243 | A1 | 6/2002 | Newton | |
| 2002/0105550 | A1 | 8/2002 | Biebesheimer et al. | |
| 2002/0133545 | A1 | 9/2002 | Fano et al. | |
| 2002/0152173 | A1 | 10/2002 | Rudd | |
| 2002/0164997 | A1 | 11/2002 | Parry | |
| 2003/0016238 | A1 | 1/2003 | Sullivan et al. | |
| 2003/0018742 | A1 | 1/2003 | Imago | |
| 2003/0032426 | A1 | 2/2003 | Gilbert et al. | |
| 2003/0043178 | A1 | 3/2003 | Gusler et al. | |
| 2003/0048288 | A1 | 3/2003 | Drif et al. | |
| 2003/0064805 | A1 | 4/2003 | Wells | |
| 2003/0098876 | A1 | 5/2003 | Makinen | |
| 2003/0100964 | A1 | 5/2003 | Kluge et al. | |
| 2003/0101178 | A1 | 5/2003 | Miyata et al. | |
| 2003/0125057 | A1 | 7/2003 | Pesola | |
| 2003/0132854 | A1 | 7/2003 | Swan et al. | |
| 2003/0191820 | A1 | 10/2003 | Ludtke | |
| 2003/0192947 | A1 | 10/2003 | Toedtli | |
| 2003/0222897 | A1 | 12/2003 | Moore et al. | |
| 2003/0227392 | A1 | 12/2003 | Ebert et al. | |
| 2004/0034651 | A1 | 2/2004 | Gupta et al. | |
| 2004/0067773 | A1 | 4/2004 | Rachabathuni et al. | |
| 2004/0088228 | A1 | 5/2004 | Mercer et al. | |
| 2004/0088696 | A1* | 5/2004 | Kawano et al. | 717/171 |
| 2004/0093102 | A1 | 5/2004 | Liiri et al. | |
| 2004/0095480 | A1* | 5/2004 | Battles et al. | 348/231.9 |
| 2004/0103153 | A1 | 5/2004 | Chang et al. | |
| 2004/0107043 | A1* | 6/2004 | de Silva | 701/200 |
| 2004/0107144 | A1 | 6/2004 | Short | |
| 2004/0111273 | A1 | 6/2004 | Sakagami et al. | |
| 2004/0117131 | A1 | 6/2004 | Peters et al. | |
| 2004/0117634 | A1 | 6/2004 | Letterer et al. | |
| 2004/0121764 | A1 | 6/2004 | Rivero | |
| 2004/0128613 | A1* | 7/2004 | Sinisi | 715/500 |
| 2004/0136574 | A1 | 7/2004 | Kozakaya et al. | |
| 2004/0139180 | A1 | 7/2004 | White et al. | |
| 2004/0162896 | A1 | 8/2004 | Cen et al. | |
| 2004/0174434 | A1* | 9/2004 | Walker et al. | 348/211.3 |
| 2004/0179545 | A1 | 9/2004 | Erola et al. | |
| 2004/0201867 | A1 | 10/2004 | Katano | |
| 2004/0205191 | A1 | 10/2004 | Smith et al. | |
| 2004/0242224 | A1 | 12/2004 | Janik et al. | |
| 2005/0055287 | A1 | 3/2005 | Schmidtberg et al. | |
| 2005/0060436 | A1 | 3/2005 | Kienhoefer | |
| 2005/0076302 | A1* | 4/2005 | Okamoto | 715/709 |
| 2005/0080879 | A1 | 4/2005 | Kim et al. | |
| 2005/0108044 | A1 | 5/2005 | Koster | |
| 2005/0136903 | A1 | 6/2005 | Kashima et al. | |
| 2005/0154985 | A1 | 7/2005 | Burkhart et al. | |
| 2005/0160270 | A1 | 7/2005 | Goldberg et al. | |
| 2005/0219223 | A1 | 10/2005 | Kotzin et al. | |
| 2005/0228869 | A1 | 10/2005 | Imago | |
| 2005/0262062 | A1 | 11/2005 | Xia | |
| 2005/0268234 | A1* | 12/2005 | Rossi et al. | 715/705 |
| 2006/0026304 | A1 | 2/2006 | Price | |
| 2006/0028428 | A1* | 2/2006 | Dai et al. | 345/156 |
| 2006/0055805 | A1* | 3/2006 | Stockton et al. | 348/333.01 |
| 2006/0073815 | A1 | 4/2006 | Pines et al. | |
| 2006/0092033 | A1 | 5/2006 | Hoff et al. | |
| 2006/0100912 | A1 | 5/2006 | Kumar et al. | |
| 2006/0115802 | A1* | 6/2006 | Reynolds | 434/236 |
| 2006/0164239 | A1 | 7/2006 | Loda | |
| 2006/0170687 | A1* | 8/2006 | Nakamura et al. | 345/473 |
| 2007/0005233 | A1* | 1/2007 | Pinkus et al. | 701/200 |
| 2007/0027903 | A1 | 2/2007 | Evans et al. | |
| 2007/0033414 | A1 | 2/2007 | Dunko | |
| 2007/0064644 | A1 | 3/2007 | Dowling et al. | |
| 2010/0005153 | A1 | 1/2010 | Tsao | |

FOREIGN PATENT DOCUMENTS

| | | |
|---|---|---|
| JP | 2003-030207 | 1/2003 |
| JP | 2003-084954 | 3/2003 |
| JP | 2003-114897 A | 4/2003 |
| JP | 2003-228451 | 8/2003 |

OTHER PUBLICATIONS

PCT International Search Report; International App. No. PCT/US05/38495; Jul. 9, 2008; pp. 1-2.

PCT International Search Report; International App. No. PCT/US05/38839; Jul. 7, 2008; pp. 1-3.

Chinese State Intellectual Property Office, Decision of Final Rejection, App. No. 2005/800444393 (Based on PCT Patent Application No. PCT/US2005/038495); Oct. 13, 2010 (received by our Agent on Oct. 20, 2010); pp. 1-13.

U.S. Appl. No. 12/798,451, Jung et al.

European Patent Office, Supplementary European Search Report, Pursuant to Rule 62 EPC; App. No. EP 05824191; Sep. 15, 2010 (received by our Agent on Sep. 24, 2010); pp. 1-5.

U.S. Appl. No. 12/592,071, Jung et al.

U.S. Appl. No. 12/592,073, Jung et al.

U.S. Appl. No. 12/5660,240, Jung et al.

U.S. Appl. No. 12/660,245, Jung et al.

Japanese State Intellectual Property Office, Office Action; App. No. 2007-538180 (Based on PCT Patent Application No. PCT/US05/038495);Bearing a date of May 31, 2011 (received by our Agent on May 31, 2011); pp. 1-2 (Translation not available).

Japanese State Intellectual Property Office, Notice of Rejection; App. No. 2007-538180 (Based on PCT Patent Application No. PCT/US05/038495); Bearing a date of May 31, 2011 (received by our Agent on May 31, 2011); pp. 1-2 (machine translation).

The State Intellectual Property Office of the People's Republic of China, Office Action; App. No. 2005-80044439.3; Oct. 19, 2011; 6 pages (translation not available).

Alexander, Keith; Gilliam, Tig; Gramling, Kathy; Grubelic, Chris; Kleinberger, Herb; Leng, Stephen; Moogimane, Dhaval; Sheedy, Chris; "IBM Business Consulting Services—Applying Auto—ID to Reduce Losses Associated with Shrink"; Auto-ID Center Massachusetts Institute ofTechnology; bearing dates of Nov. 1, 2002, Feb. 1, 2003, Jun. 2002 and Nov. 2002; pp. 1-56; AUTO-ID Center IBM-AutoID-BC-003; located at: http://quintessenz.org/rfid.docs/www.autoidcenter.org/publishedresearch/ibm-autoid-bc-003.pdf; printed on Feb. 3, 2005.

"Capabilities"; Profit Logic; pp. 1-2; located at: http://www.profitlogic.com/capabilities.htm; printed on Feb. 3, 2005.

Emigh, Jacqueline; "IBM Unleashes New RFID Middleware"; eWeek Enterprise News & Reviews—Attention Health Care Technology Experts; bearing dates of Dec. 16, 2004 and 2005; pp. 1-2; located at: http://www.eweek.com/print_article2/0,2533,a=141068.00.asp; printed on Feb. 3, 2005.

"EPC RFID-based Inventory Management Solution Delivers Faster, Better Goods Logistics"; Solution Architects; bearing a date of 2003; pp. 1-15; located at: www.intel.com/business/bss/solutions/blueprints/pdf/30034101.pdf; printed on Jan. 10, 2005.

"Get real time warehouse management with Cadence WMS."; Cadre Cadence Warehouse Management System Software; pp. 1; located at: http://www.cadretech.com/warehouse_mgmt.html; printed on Jan. 10, 2005.

"IBM RFID solution for asset tracking and inventory management"; pp. 1-3; located at: http://www-1.ibm.com/industries/wireless/doc/content/solution/1025230104.html; printed on Feb. 3, 2005.

"IBM RFID solution for asset tracking and inventory management"; pp. 1-3; located at: http://www-1.ibm.com/industries/wireless/doc/content/solution/1025230204.html; printed on Feb. 3, 2005.

Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.

Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.

"Nordstrom: Inventory Management Transformation"; Accenture.com; bearing a date of 1995-2005; pp. 1-2; located at: http://www.accenture.com/xd/xd.asp?it=enweb&xd=industries%5Cproducts%5Cretail%5Ccase%5Creta_nordstrom.xml; printed on Feb. 3, 2005.

"Solutions"; Profit Logic; pp. 1-2; located at: http://www.profitlogic.com/solutions.htm; printed on Feb. 3, 2005.

The EPCglobal Network™: Overview of Design, Benefits, & Security; EPCglobal Inc.; Sep. 24, 2004; pp. 1-11; located at: http://www.epcglobalinc.org/news/position_papers.html; printed on Feb. 3, 2005.

U.S. Appl. No. 11/528,480, Jung et al.
U.S. Appl. No. 11/524,025, Jung et al.
U.S. Appl. No. 11/069,893, Jung et al.
U.S. Appl. No. 11/061,387, Jung et al.
U.S. Appl. No. 11/041,861, Jung et al.
U.S. Appl. No. 11/037,828, Jung et al.
U.S. Appl. No. 11/037,827, Jung et al.
U.S. Appl. No. 11/037,825, Jung et al.
U.S. Appl. No. 11/000,736, Jung et al.
U.S. Appl. No. 11/000,687, Jung et al.
U.S. Appl. No. 10/978,243, Jung et al.
U.S. Appl. No. 10/974,555, Jung et al.
U.S. Appl. No. 10/974,476, Jung et al.
U.S. Appl. No. 12/012,216, Jung et al.

Excerpt from The Cambridge Dictionary Online; bearing a date of 2009; printed on Oct. 23, 2009; pp. 1-2; Cambridge University Press; located at http://dictionary.cambridge.org/define.asp?key=62453&dict=CALD; (as provided by examiner).

* cited by examiner

ENHANCED CONTEXTUAL USER ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending United States patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, serial No. 10/974476.

3. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974555.

In an event of any inconsistencies between the instant application and an application incorporated by reference, the instant application controls.

SUMMARY

An embodiment provides a method. The method includes receiving a query related to an electronic device through a first user interface associated with the electronic device, sensing a context of the electronic device, and providing an assistance correlating to the query and the sensed context through a second user interface associated with the electronic device. The first user interface may include an element of the electronic device in a first state and the second user interface may include the element of the electronic device in a second state. The first user interface may include an element of the electronic device in a first mode and the second user interface may include the element of the electronic device in a second mode. The first user interface associated with an aspect of the electronic device may include a first user interface physically associated with an aspect of the electronic device. The first user interface associated with an aspect of the electronic device may include a first user interface virtually associated with the aspect of the electronic device.

The receiving a selection of an aspect of the electronic device through a first user interface associated with the electronic device may include detecting a touch through a first user interface associated with the electronic device. The sensing a context of the electronic device may include sensing a context extrinsic to the electronic device. The sensing a context of the electronic device may include sensing an environment extrinsic to the electronic device. The sensing a context of the electronic device may include sensing a context intrinsic to the electronic device. The sensing a content intrinsic to the electronic device may include sensing a configuration context, a software context intrinsic to the electronic device, and/or a hardware context. The receiving a query through a first user interface may include detecting a touch to the first user interface. The receiving a query through a first user interface may include detecting a sound through the first user interface. The detecting a sound may include detecting a spoken word.

The electronic device may include a computing device and the receiving a query may include receiving a query related to an aspect of the computing device. The electronic device may include an electrical appliance and the receiving a query may include receiving a query related to an aspect of the electrical appliance. The electronic device may include a limited resource computing device and the receiving query may include receiving a query related to an aspect of the limited resource computing device. The electronic device may include a pervasive computing device and the receiving a query may include receiving a query related to an aspect of the pervasive computing device.

The providing an assistance may include providing a user assistance, visually providing an assistance, audibly providing an assistance, providing a spoken assistance, tactilely providing an assistance, providing a guided response assistance, and/or providing an interactive tutorial assistance. The providing an assistance may include providing an assistance corresponding with a physical element of the electronic device. The providing an assistance corresponding with the physical element of the device may include blinking a light emitter associated with the physical element. The providing an assistance may include providing a guidance corresponding with a process associated with the electronic device. The providing an assistance may include providing a description of an aspect of the electronic device. The providing an assistance may include providing an assistance showing how an aspect of the device works. The method may further include searching an assistance file for an assistance correlating with the query and the sensed context. The receiving a query related to an electronic device may include receiving a query related to an electronic device and a sensed context of the electronic device. The method may further include a computer-readable medium containing computer instructions which, when run on a computing device, cause the computing device to perform the method. The computer-readable medium may include a computer storage medium. The computer storage medium may be carried by a computer-readable carrier. The computer-readable medium may include a communications medium.

Another embodiment provides a system. The system includes an electronic device including a context sensor, a first user interface, and a second user interface, and instructions. The instructions when implemented in the electronic device cause the electronic device to receive a query related to the electronic device through a first user interface associated with the electronic device, and receive a context of the electronic device from the context sensor. The instructions also cause the electronic device to provide an assistance corresponding to the query and the context of the electronic device through a second user interface associated with the electronic device.

The first user interface may include an element of the electronic device in a first state and the second user interface may include the element of the electronic device in a second state. The first user interface may include an element of the electronic device in a first mode and the second user interface may include the element of the electronic device in a second mode. The second user interface may include the first user interface. The first user interface may include a button. The button may include a tangible button. The button may include a virtual button. The second user interface may include a visual display. The visual display may include a visual display surface. The visual display may include a light emitter. The context sensor may include a context sensor configured to sense a context extrinsic to the electronic device. The context sensor may include a sensor configured to sense an environment extrinsic to the electronic device. The context sensor may include a sensor configured to sense a context intrinsic to the electronic device.

A further embodiment provides an apparatus. The apparatus includes a means associated with an electronic device for receiving a query related to the electronic device, and a means associated with the electronic device for sensing a context of the electronic device. The apparatus further includes means associated with the electronic device for providing an assistance corresponding to the query.

An embodiment provides a system. The system includes a query module operable to receive a query related to an electronic device through a first user interface associated with an electronic device, and a sensor module operable to sense a context of the electronic device. The system also includes an assistance module operable to provide an assistance corresponding to the query and the context of the electronic device through a second user interface associated with the electronic device.

Another embodiment provides method. The method includes receiving a selection corresponding to an aspect of an electronic device through a first user interface of the electronic device, and receiving a selection corresponding to an assistance request related to the aspect of the electronic device through a second user interface of the electronic device. The method also includes sensing an environmental context of the electronic device, and providing an assistance correlating to the assistance request related to the aspect of the electronic device and the environmental context through a third user interface of the electronic device.

The first user interface may include an element of the electronic device in a first state, and the second user interface may include the element of the electronic device in a second state. The first user interface may include an element of the electronic device in a first state, the second user interface may include the element of the electronic device in a second state, and the third user interface may include the element of the electronic device in a third state. One of the first user interface, the second user interface, and the third user interface may include an element of the electronic device in a first state, and another of the first user interface, the second user interface, and the third user interface may include the element of the electronic device in a second state. The first user interface may include an element of the electronic device in a first mode and the second user interface may include the element of the electronic device in a second mode. The first user interface may include an element of the electronic device in a first mode, the second user interface may include the element of the electronic device in a second mode, and the third user interface may include the element of the electronic device in a third mode. One of the first user interface, the second user interface, and the third user interface may include an element of the electronic device in a first mode, and another of the first user interface, the second user interface, and the third user interface may include the element of the electronic device in a second mode.

The receiving a selection corresponding to an aspect of an electronic device through a first user interface of the electronic device may include receiving a selection corresponding to an aspect of an electronic device through a first user interface of the electronic device associated with the aspect. The receiving a selection corresponding to an aspect of an electronic device through a first user interface may include a detecting a touch to the first user interface. The receiving a selection corresponding to an aspect of an electronic device through a first user interface may include detecting a sound through the first user interface, detecting a spoken word, and/or detecting a touch to the second user interface. The receiving a selection corresponding to an assistance request related to the aspect of the electronic device through a second user interface of the electronic device may include receiving a selection corresponding to a predetermined assistance request related to the aspect of the electronic device through a second user interface of the electronic device.

The method may further include searching an assistance file for the assistance correlating to the assistance request and the sensed context. The searching the assistance file may include searching an assistance file stored in association with the electronic device.

The method may further include receiving an input responsive to the provided assistance. The input responsive to the provided assistance may include a request for an additional assistance correlating to the provided assistance. The method may further include providing another assistance corresponding to the received input responsive to the provided assistance. The method may further include a computer-readable medium containing computer instructions which, when run on a computing device, cause the computing device to perform the method. The computer-readable medium may include a computer storage medium. The computer-readable medium may be carried by a computer-readable carrier.

A further embodiment provides a system. The system includes an electronic device having a context sensor, a first user interface, a second user interface, and third user interface. The system also includes instructions which when implemented in the electronic device cause the electronic device to perform operations. Operations include receive a selection corresponding to an aspect of the electronic device through a first user interface of the electronic device; and receive a selection corresponding to an assistance request related to the aspect of the electronic device through a second user interface of the electronic device. The operations also include receive a context of the electronic device from the context sensor; and provide an assistance correlating to the assistance request related to the aspect of the electronic device and to the context of the electronic device through a third user interface of the electronic device.

The first user interface may include an element of the electronic device in a first state, and the second user interface may include the element of the electronic device in a second state. The first user interface may include an element of the electronic device in a first state, the second user interface may include the element of the electronic device in a second state, and the third user interface may include the element of the electronic device in a third state. One of the first user interface, the second user interface, and the third user interface may include an element of the electronic device in a first state, and another of the first user interface, the second user interface, and the third user interface may include the element of the electronic device in a second state. The first user interface may include an element of the electronic device in a first mode and the second user interface may include the element of the electronic device in a second mode. The first user interface may include an element of the electronic device in a first mode, the second user interface may include the element of the electronic device in a second mode, and the third user interface may include the element of the electronic device in a third mode. One of the first user interface, the second user interface, and the third user interface include an element of the electronic device in a first mode, and another of the first user interface, the second user interface, and the third user interface may include the element of the electronic device in a second mode. The first user interface of the electronic device may include a first user interface of the electronic device associated with the aspect of the electronic device.

The electronic device may include a pervasive computing device. The electronic device may include a limited resource computing device. The instructions may further include an operation to search an assistance file for the assistance correlating to the assistance request. The instructions may further operations that receive an input responsive to the provided assistance, and provide another assistance corresponding to the received input responsive to the provided assistance.

An embodiment provides an apparatus. The apparatus includes a means for receiving a selection corresponding to an aspect of an electronic device, and a means for receiving a selection corresponding to an assistance request related to the aspect of the electronic device. The apparatus also includes a means for sensing a context of the electronic device, and a means for providing an assistance correlating to the assistance request related to the aspect of the electronic device.

Another embodiment provides a method. The method includes activating a help mode in an electronic device, and receiving a selection of an aspect of the electronic device through a receiver associated with the aspect. The method also includes sensing a contextual parameter related to the electronic device through a sensor associated with the electronic device, and broadcasting a tutorial that includes information related to the selected aspect of the electronic device and the contextual parameter through an indicator associated with the electronic device.

A further embodiment provides a system. The system includes an electronic device having a context sensor, a receiver associated with an aspect of the electronic device, and an indicator. The system also includes instructions which when implemented in the electronic device cause the electronic device to perform operations that activate a help mode, and receive a selection of the aspect of the electronic device through the receiver, sense a contextual parameter related to the electronic device through the sensor, and broadcast a tutorial that includes information related to the selected aspect of the electronic device and to the contextual parameter through an indicator associated with the electronic device.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

DETAILED DESCRIPTION

Figure 1:
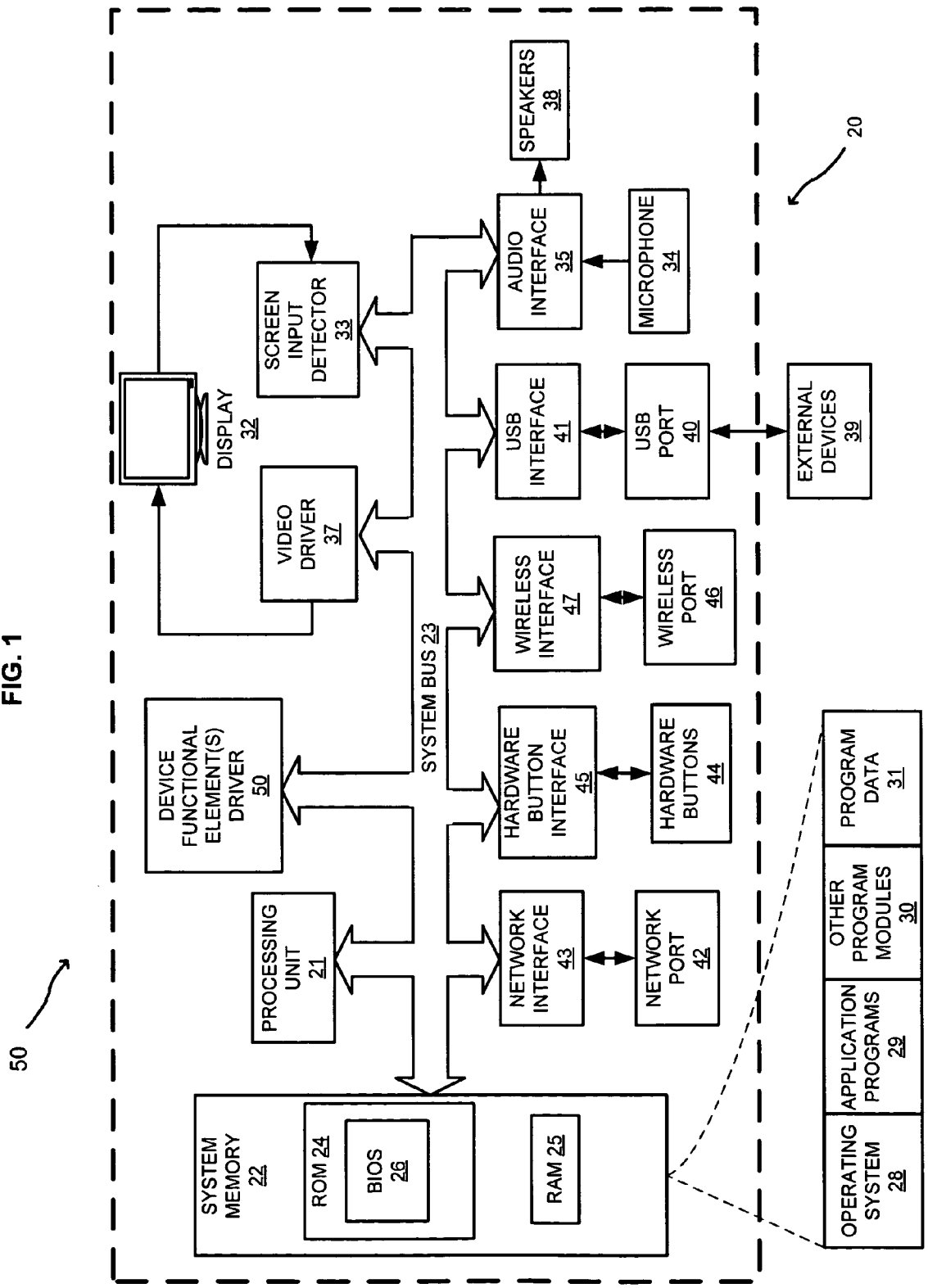
FIG. 1 illustrates an exemplary system in which embodiments may be implemented, including a thin computing device and a functional element of an electronic device.

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Features, functionality, and options of computing devices, such as personal computers, have rapidly advanced as technology provides increased processor speeds, storage capacity, connectivity, and interconnectivity, all at decreased cost. At the same time, software, programs, games, and procedures have similarly rapidly advanced. Additionally, rapid advances have been made in interconnectability and interoperability of computing devices and other devices, such as handheld devices and cell phones. These advances are intended to provide a user with many benefits. However, realization of these benefits may require that a user read and re-read manuals.

When new, a user may or many not take the trouble to read a manual. Manuals are sometimes considered too complex and troublesome to comprehend. As a result, the advances may be unused and the user dissatisfied. A user may benefit from being able to input a selection of an aspect of a computer relevant to a need or question through a user interface associated with the aspect, and then let the computer guide them from there using the same or another user interface of the computer.

Additionally, manuals are sometimes lost, misplaced, or unavailable, such as for example, when traveling. A user may further benefit by being able to obtain assistance directly from the computer of a nature often provided by a comprehensive user manual.

Further, as a result of rapidly advancing computer technology, computing devices are become smaller, more powerful, and cheaper. The advancing computing technology is moving beyond the personal computer and into everyday items and devices, providing embedded technology and connectivity. Almost any thing or item, from buildings to clothing, from telephones to tools, from appliances to cars, from homes to the human body, from personal information devices to a common a coffee mug, can have an embedded electronic device that includes a thin computing device. The embedded electronic device typically improves performance and capacity of a basic functionality of the item, and may connect the item with a network of other items or the Internet. These items with embedded electronic devices may be described using a variety of names, which may not have a bright line distinction between them. Commonly used names include a limited resource computing device, limited capacity computing device, ubiquitous computing device, pervasive computing device, digital appliance, and Internet appliance. Such items may be collectively referred to herein from time-to-time as "pervasive computing," or a "pervasive computing device" for economy of words and to aid in reading and understanding embodiments disclosed herein.

Pervasive computing provides increased functionality, it often requires increased interaction between a user and a previously dumb device. Pervasive computing devices, such as conventional telephones, cell phones, smart phones, pocket organizers, and personal digital assistants, often present a user with widely varying user interface protocols. This may contribute to user confusion about an aspect of the pervasive computing device they are viewing, such as a particular button. As a result, simply finding appropriate aspects of the device related to a portion of the user manual may be difficult or impossible. Like a computer user, a pervasive computing device user may benefit from interactive assistance.

Rapidly advancing technology may also provide an opportunity for increased interaction between traditionally dumb items and user manuals. Many dumb items have become more complex and sophisticated to meet user demand. For example, simply adjusting an ergonomic chair requires complex instructions and location of knobs placed at odd locations. User manuals have correspondingly become more complex and sometimes confusing. As a result, simply finding appropriate aspects of the item related to a portion of the user manual may be difficult or impossible. A user may benefit from interactive assistance with these traditionally dumb items.

FIG. 1 and the following discussion are intended to provide a brief, general description of an environment in which embodiments may be implemented. FIG. 1 illustrates an exemplary system that includes a thin computing device 20 that interfaces with an electronic device that includes one or more functional elements. For example, the electronic device may include any item having electrical and/or electronic components playing a role in a functionality of the item, such as a limited resource computing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33). The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
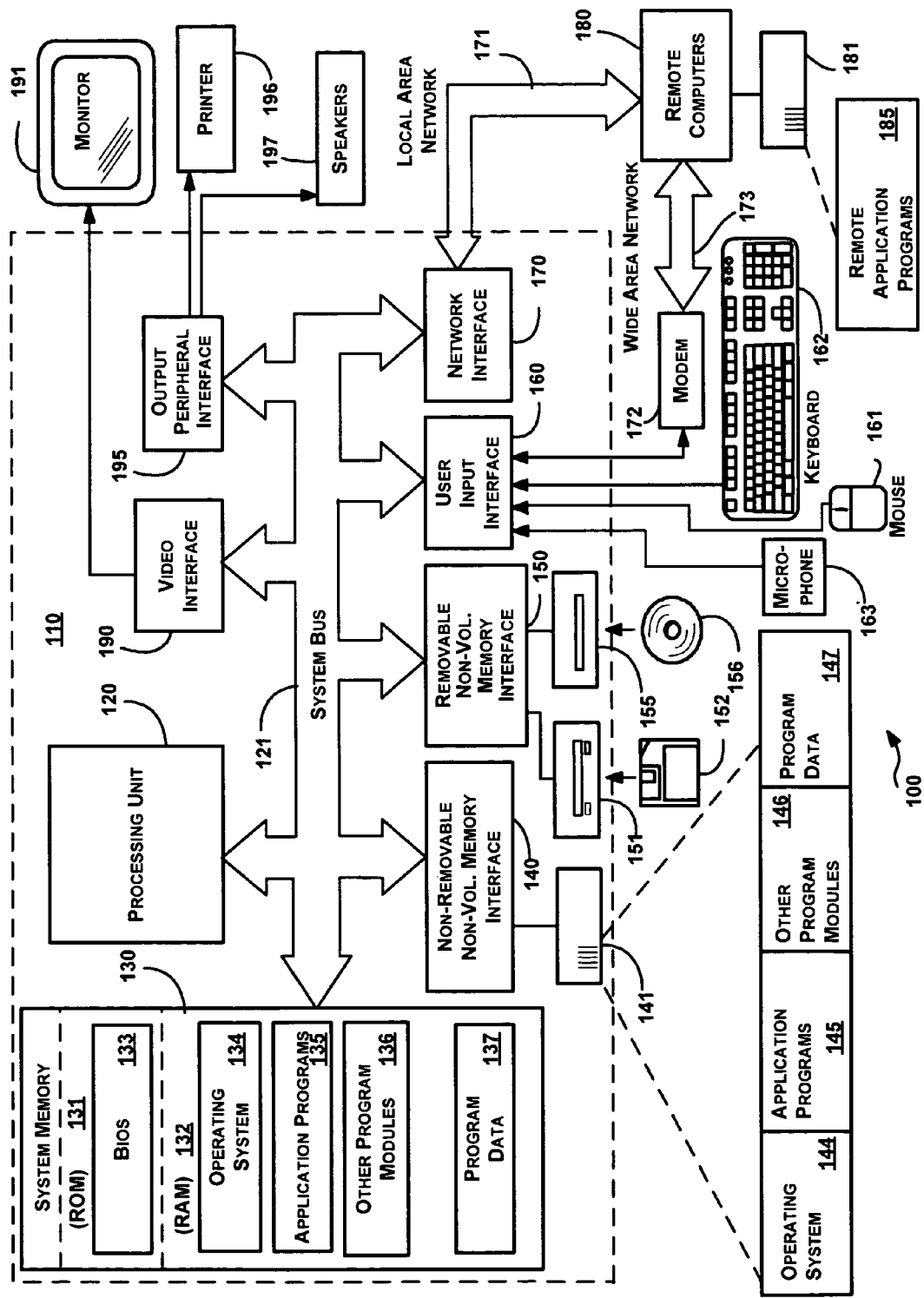
FIG. 2 illustrates another exemplary system in which embodiments may be implemented, including a general-purpose computing device.

FIG. 2 illustrates another exemplary system in which embodiments of may be implemented. FIG. 2 illustrates an electronic device that may correspond in whole or part to a general-purpose computing device, shown as a computer 100. Components of the computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 100 typically includes a variety of computer-readable media. Computer-readable media can be any available media that can be accessed by the computer 100 and include both volatile and nonvolatile media, removable and non-removable media. By way of example, and not limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 100. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 100, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 100 may also include other removable/non-removable, volatile/nonvolatile computer storage media. By way of example only, FIG. 2 illustrates a non-removable non-volatile memory interface (hard disk interface) 140 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer-readable instructions, data structures, program modules, and other data for the computer 100. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computer 100 through input devices such as a microphone 163, keyboard 162 and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 100, or portions thereof, may be stored in a remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, embodiments will be described with reference to acts and symbolic representations of operations that are performed by one or more computing devices, such a computing device 20 of FIG. 1 and/or computer 100 of FIG. 2, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 illustrate an example of a suitable environment on which embodiments may be implemented. The computing device 20 of FIG. 1 and/or computer 100 of FIG. 2 are examples of a suitable environment and are not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network PCs, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

Figure 3:
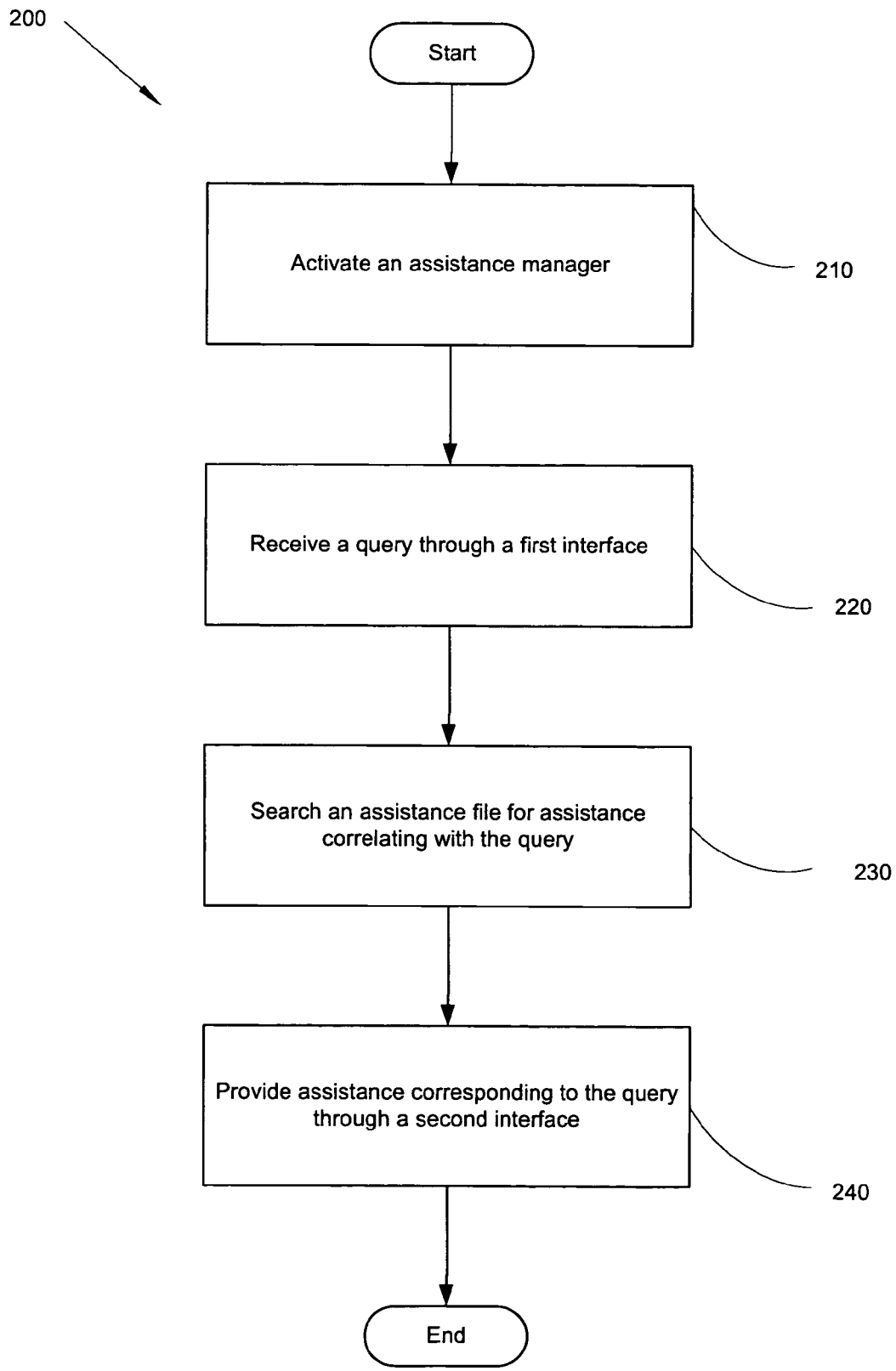
FIG. 3 is a flow diagram illustrating an exemplary operation that provides assistance.

FIG. 3 is a flow diagram illustrating an exemplary operation 200 that provides assistance. After a start operation, the operation moves to operation 210. At activation operation 210, an assistance manager is activated. The assistance manager typically includes instructions, such as computer-readable instructions, for example, a program, process, and/or application operating on an electronic device that implements the exemplary operation 200 that provides assistance.

At query operation 220, a query related to an electronic device is received through a first interface associated with the electronic device. The query may include a selection of an aspect of the electronic device as a subject of the query. The query may include any aspect of the electronic device for which a user might desire assistance, such as, a feature of the device, an element of the device, and a process associated with the device. The query related to the electronic device may include an assistance request related to the electronic device. The assistance request may include a request related to the electronic device in any manner, including the selected aspect of the electronic device. For example, the assistance request may include any request related to the electronic device, such as "show me," "demonstrate," and "guide me." The first interface may include a first user interface.

The electronic device may be incorporated into any type of appliance and/or item. In certain embodiments, the electronic device may include a computing device, such as a personal computer and a server. In other embodiments, the electronic device may include a limited resource computing device, an appliance, a pervasive computing device, and a digital appliance. Examples may include a PDA, a cell phone, a Blackberry appliance, an on-board computing device, such as in a car, boat, and/or aircraft, an X-Box, a home gateway, a set-top box, a point-of-sale terminal, a digital camera, a TiVo, and an automated teller machine. By way of further example, the electronic device may include a computing device and the query may relate to an aspect of the computing device. The electronic device may include an electrical appliance and the query may relate to an aspect of the electrical appliance. The electronic device may include a limited resource computing device and the query may relate to an aspect of the limited resource computing device. The electronic device may include a pervasive computing device and the query may relate to an aspect of the pervasive computing device. The electronic device may include a digital appliance and the query may relate to an aspect of the digital appliance.

At search operation 230, an assistance file is searched for an assistance response correlating to the query. Searching the assistance file may include searching an assistance file stored in a storage media associated with the electronic device, such as the system memory 22 of FIG. 1, or coupled with the electronic device. Alternatively, the assistance file may be stored and/or searched remotely and coupled with a functionality of the operation 230, such as by a network, such as a LAN, a WAN, or the Internet.

At assistance operation 240, an assistance response is provided correlating to the query through a second interface of the electronic device. In an embodiment, the assistance response provided may include visually providing an assistance with a physical element of the device, such as blinking a light associated with the physical element. For example, the physical element may be a physical button and the light may be a light emitting device incorporated into the button. In this example, the assistance may include blinking the LED associated with the button. In an alternative embodiment, the second interface may include an LED and a third interface may include a speaker. The provided assistance may include providing an audible assistance presentation from the speaker and blinking the LED appropriately during the presentation. The audible assistance presentation may include a spoken presentation that includes a word or words. The providing an assistance further may include tactilely providing an assistance presentation.

The provided assistance may include guidance through a process associated with the aspect of the device, a description of the aspect of the device, a showing how the aspect of the device works, and/or an interactive tutorial. The assistance may be provided in any manner, such as a visual presentation, an audio presentation, a spoken presentation, a tactile presentation, and/or a combination of two or more of these manners of presentation.

In an embodiment, the second interface may be a second user interface. The second user interface may include a visual display, a graphical display, and a graphical user interface. The second user interface may include an audio display, such as an acoustic speaker. Further, the second user interface may include a tactile interface, such as a vibrating component. The operation then proceeds to a stop operation.

The first interface and the second interface may be at least substantially similar, and the second user interface may include the first user interface. In an embodiment, the first interface and the second interface may comprise a same physical or virtual element of the electronic device. The first interface and the second interface may share a same physical or virtual element, but be separately activated when the physical or virtual element is in different activate modes or states. For example, an interface having a physical structure and in a first state may function as the first interface, and in a second state may function as the second interface. In this example, a single physical button interface may have a plurality of interface states. Continuing with these examples, a physical button associated with an electronic device may have normal operating function related to the electronic device. Upon activation of an assistance manager and entry into an assistance mode, the same physical button transitions to a first state and functions as the first interface that receives a query, such as at the query operation 220. Upon occurrence of an event, such as receipt of the query at the query operation 220, or finding an assistance corresponding to the query at the search operation 230, the same physical button transitions to a second state. In the second state, the physical button functions as the second interface that provides assistance corresponding to the query, such as at the provide operation 240.

In another example, an interface, such as a physical button, may function as a first interface when operated in a first mode and function as a second interface when operated in a second mode. In this example, a single physical button may function as a first interface when pressed quickly once and as a second interface when pressed slowly once. Continuing with this example, the single physical button may function as a first interface when pressed once and as a second interface when pressed twice in quick succession.

In an embodiment, the operation 200 that provides assistance may be considered to be an electronic-device assistance manager. The assistance manager may be implemented in any combination of hardware, software, and/or firmware configured to effect the operation 200 that provides assistance, depending upon the design choices of the system designer. A further embodiment includes a computer-readable media containing computer instructions which, when run on a computing device, cause the computing device to perform the operation 200 that provides assistance. The computer-readable media may include a computer storage media, which may be carried by a computer-readable carrier, such as a floppy disk. Alternatively, the computer-readable media may include a communications media.

Figure 4:
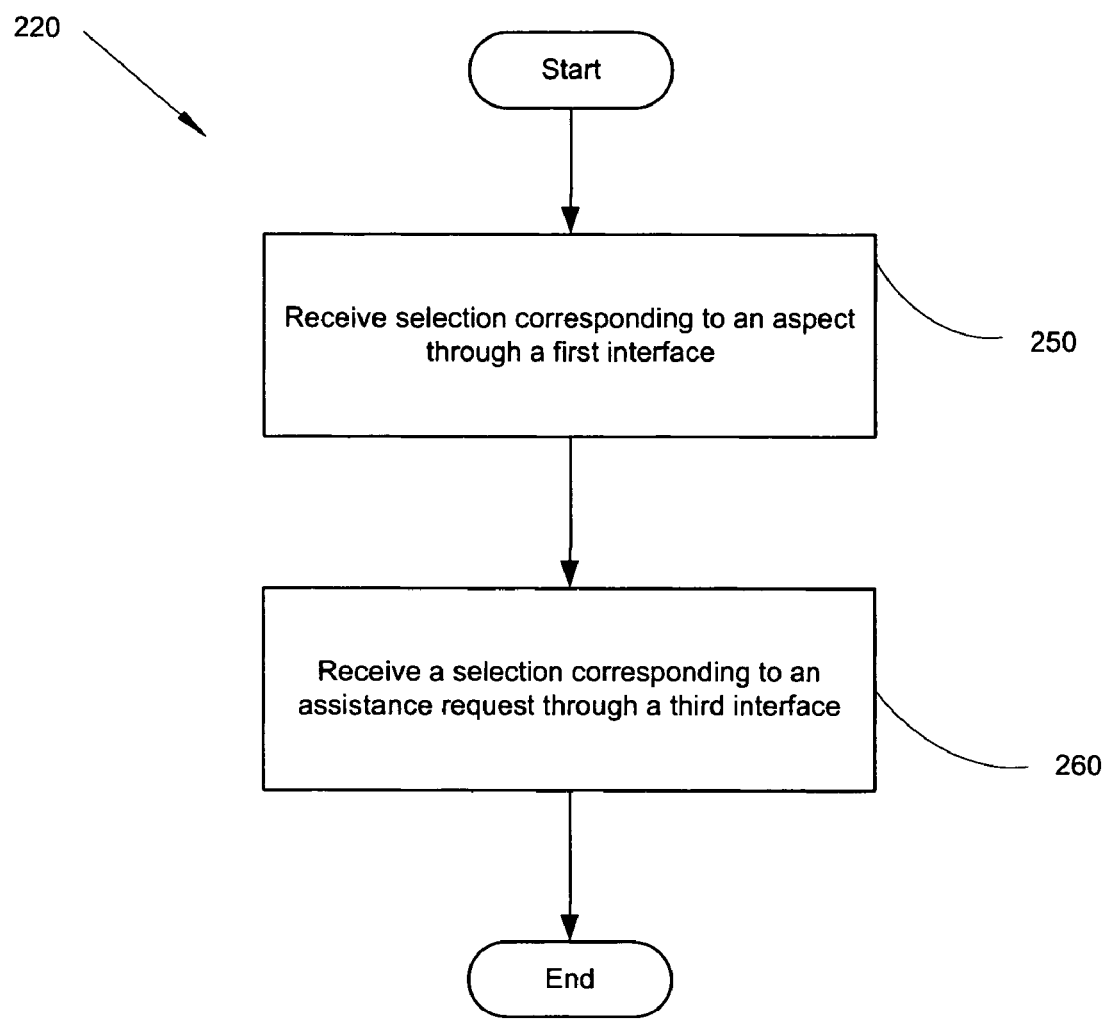
FIG. 4 is a flow diagram illustrating additional detail related to an alternative embodiment of the exemplary operation of FIG. 3.

FIG. 4 is a flow diagram illustrating additional detail related to an alternative embodiment of the exemplary query operation 220 of FIG. 3. At aspect selection operation 250, a selection corresponding to the electronic device is received through the first interface. As described in conjunction with query operation 220 of FIG. 3, the selection designates a subject matter of the query, and may include a selection of an aspect of the electronic device. The selection may include an aspect related to the electronic device, such as, a component associated with the device, a feature associated with the electronic device, a function associated with the electronic device, a program associated with the electronic device, and a process associated with the electronic device. In an embodiment, the first interface may include a first user interface.

In an embodiment, the selection may be received by detecting a touch to a first user interface associated with the electronic device, such as a button or a component. The touch may be received in any manner. For example, such as from a user body part physically contacting the first user interface, a user body part being proximate to the first user interface, and a user body part having an orientation to the first user interface. Similarly, for example, a touch may be received by a stylus physically contacting the first user interface, being proximate to the first user interface, and having an orientation to the first user interface.

The first user interface may be associated with an aspect of the electronic device, such as a physical association. Using a button for example, a first user interface may be included within a physical structure of a button, or the first user interface may be adjacent or proximate to the button. The association of a button or component and the first user interface may include a logical association. By a way of further example, an association may include a touch sensitive portion of a visual display surface. When the visual display surface displays an image or icon visually associated with an aspect of an electronic device, a touch to the displayed image or icon, or a portion of the visual display surface proximate to the displayed image or icon, may be detected and received as a selection through an interface logically associated with the electronic device, or an interface logically associated with an aspect of the electronic device.

In another embodiment, the selection may be received by detecting a sound or word. For example, the first user interface may include a microphone and processing capability to detect a sound or spoken word corresponding to a selection related to the electronic device, or to an aspect of the electronic device. For example, detecting a signal corresponding to the spoken words "lens cover" selects a lens cover of a digital camera, and is received as a selection related to the electronic device, or to the lens cover of the electronic device.

At assistance selection operation 260, a selection corresponding an assistance request is received. In an embodiment, the selection is received through a third interface of the electronic device, and the third interface may include a third user interface. The receiving a selection corresponding to an assistance request associated with the selection may include detecting a touch to the third user interface. The third user interface may include a button. The third user interface may include at least one predetermined query. The selection corresponding to an assistance request may include a request for a description of functionality, a request for a description of process, a request for instruction, a request for information, and/or a request for guidance. The request for guidance may include a request for a guidance related to replicating a previous operation of the device. The receiving a selection corresponding to an assistance request may include receiving a selection corresponding to an assistance request selected from a plurality of selections.

At least two of first, second, and third user interfaces may be at least substantially similar. In an embodiment, and similar to the embodiment of the exemplary operation 200 that provides an assistance described in conjunction with FIG. 203, at least two of the first interface, the second interface, and the third interface may comprise a same physical or virtual device. At least two of the interfaces may share a same physical or virtual device, but be separately activated when the physical or virtual device is in a different mode or state.

Figure 5:
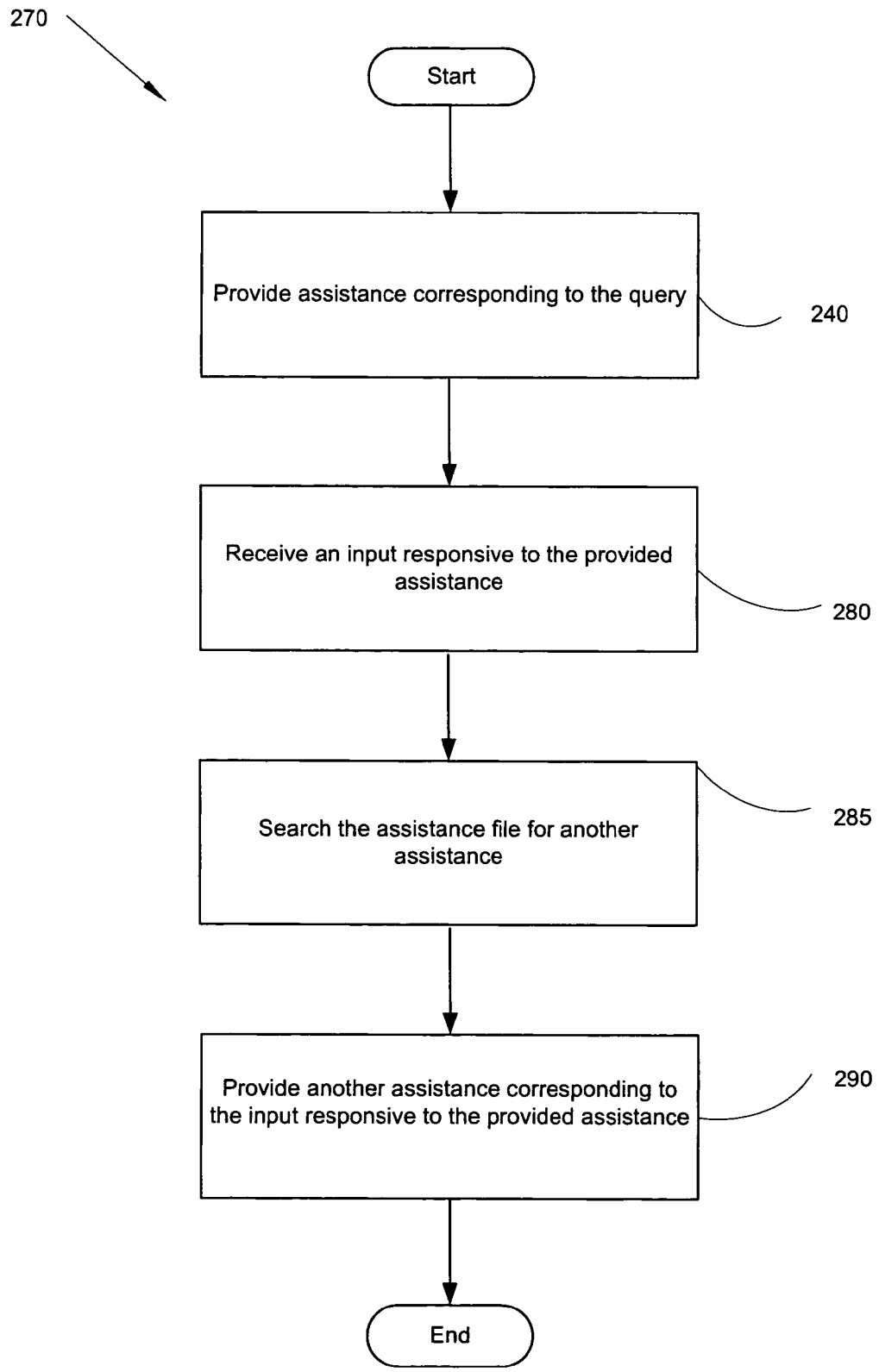
FIG. 5 is a flow diagram illustrating an exemplary operation supplementing the exemplary query operation that provides assistance described in conjunction with FIG. 3.

FIG. 5 is a flow diagram illustrating an exemplary operation 270 that provides an additional assistance, supplementing the exemplary operation 200 described in conjunction with FIG. 3. The exemplary operation 270 provides an additional assistance. After a start operation, and after the provide assistance operation 240 of FIG. 3, the exemplary operation 270 moves to a receive input operation 280. At the receive input operation 280, an input relating to the provide assistance operation 240 is received. The input may be received through any interface, including one or more of the user interfaces described in conjunction with the exemplary operation 200 and FIG. 3. In addition, the input may be received through an addition interface of the electronic device. The input relating to the provide assistance operation 240 may include a request for an additional assistance correlating to the assistance provided by the provide assistance operation 240. Alternatively, the input responsive to the provide assistance operation 240 may include a request that further correlates to the aspect of the device.

At a search operation 285, the assistance file is searched for another assistance response correlating to the input relating to the provide assistance operation 240. The assistance file may be searched in a manner substantially similar to the searching an assistance file at the search operation 230. At provide assistance operation 290, the another assistance is provided. The another assistance may be any type of assistance, including one or more of the types of assistance described above, and may include an interactive question and answer format, and a tutorial format. The exemplary operation 270 then moves to an end operation.

Figure 6:
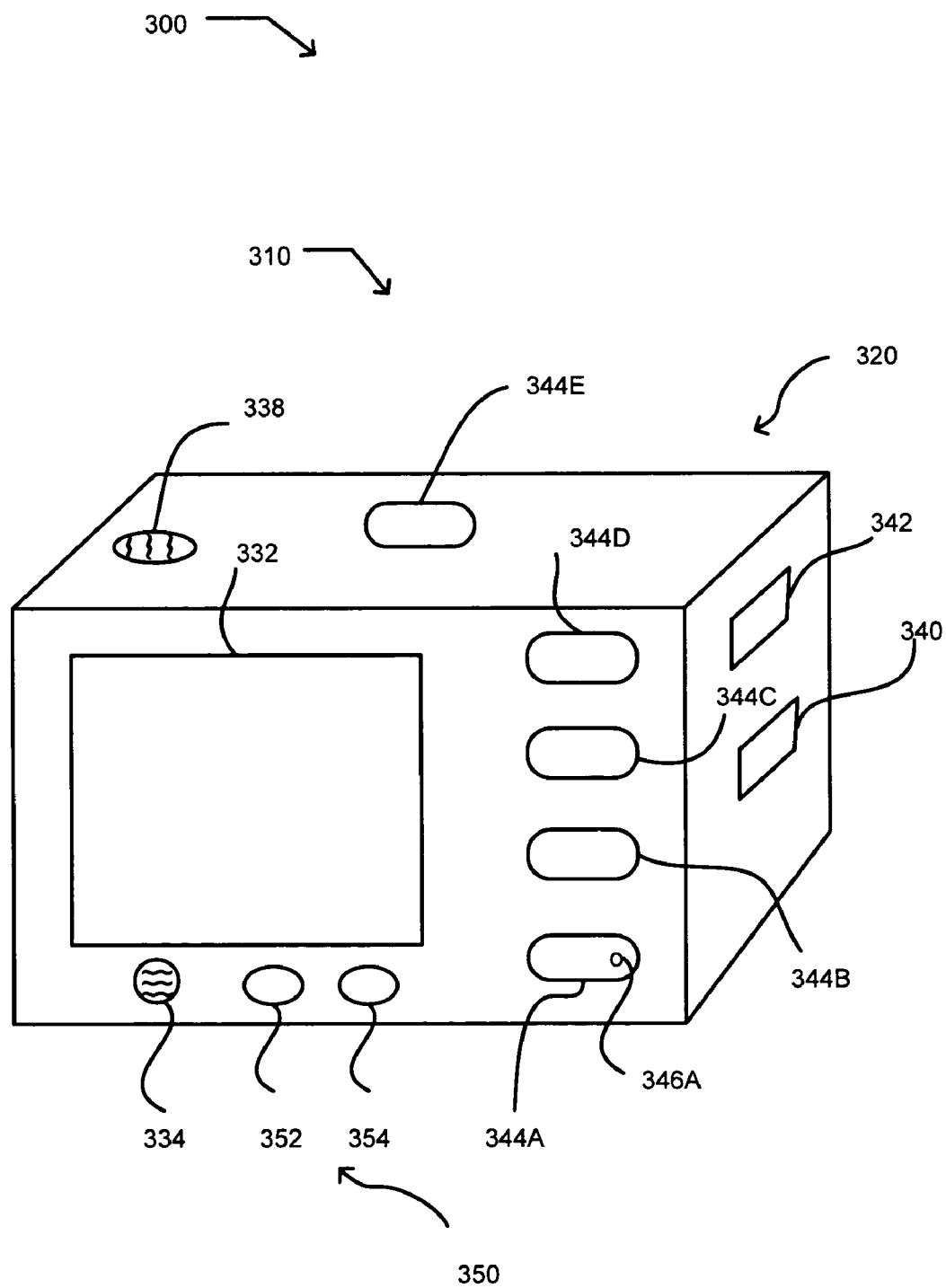
FIG. 6 illustrates an exemplary system in which embodiments may be implemented.

FIG. 6 illustrates an exemplary system 300 in which embodiments may be implemented. The system 300 includes a digital camera 310 having image capture and image storage functionality. The digital camera 310 includes a computing device (not shown), such as the thin computing device 20 described in conjunction with FIG. 1. The digital camera 310 also includes a plurality of interfaces 320. The plurality of interfaces 320 includes a display 332. In alternative embodiments, the display 332 may provide a textual, a visual display, and a graphical display. In a further embodiment, the display 332 may include touch screen functionality operable to accept a user input. The plurality of user interfaces 320 of the camera 310 also includes a microphone 334, a speaker 338, and a plurality of tangible buttons 344A-344E. One or more of the tangible buttons may include a light emitter, such as a light emitting device 346A. Further, one or more of the tangible buttons 344A-344E may include a vibrator operable to provide a tactile display. The display 332 and the tangible buttons 344A-344E may have any functionality appropriate to the digital camera. For example, button 344E may be assigned to operate a camera element, such as a shutter function. Button 344A may be assigned an "enter" function, and buttons 344B and 344C may be respectively assigned a scroll up and scroll down function relative to a menu displayed on the display 332. Button 344D may be assigned to operate another camera element, such as a lens zoom function. The digital camera 310 also includes context sensors 350, which may be selected, for example, to produce relevant information about an environment extrinsic to the digital camera. The context sensors 350 are illustrated as an external temperature sensor 352 and a light intensity sensor 354. The digital camera 310 further includes a USB port 340, and a network port 342.

The digital camera 310 also includes a system memory (not shown), such as the system memory 22 of the thin computing device 20 of FIG. 1. The system memory includes saved operating systems and programs necessary to operate the digital camera 310, and also includes an assistance manager operable to implement the operation 200 that provides assistance of FIG. 3. The system memory also includes an assistance file, which may be included in the assistance manager. The assistance file includes a body of assistance information intended to help a user in response to a plurality of user-selected requests related to the digital camera 310. The assistance manager and/or the assistance file may be provided by an original equipment manufacturer of the camera 310, or it may be provided by a third party.

The assistance manager includes operability to receive a query related to the digital camera 310 through an interface of the plurality of interfaces 320. For example, in an embodiment, detecting a user touch to the button 344D may be received as an instruction to activate the assistance manager, such as the assistance manager at operation number 210 of FIG. 3. Activation of the assistance manager transitions the user interfaces 320 to a first state. A detected subsequent user touch to another user interface of the plurality of user interfaces 320 may be received by the assistance manager a query related to the digital camera 310.

Alternatively, a detected subsequent user touch to another user interface of the plurality of user interfaces 320 may be received by the assistance manager as a selection corresponding to an aspect of the digital camera 310. The user touch may be detected by a user interface physically incorporated in the aspect of the digital camera 310 or proximate thereto.

In an alternative embodiment, the query may be received by detecting a signal responsive to a sound or voice received by the microphone 334. For example, a detection and recognition of a signal responsive to a spoken "help" command to the microphone 334 may be received as an instruction to activate the assistance manager. Further, a detection and recognition of a signal responsive to spoken words "shutter button" may be received by the assistance manager has a selection corresponding to an aspect of the digital camera 310.

The assistance manager includes operability to provide assistance, such as information, advice, guidance, and instructions, through at least one the plurality of interfaces 320 of the digital camera 310, such as the display 332, the tangible buttons 344A-344E, and the speaker 338. In an embodiment, the provided assistance may include any type of presentation, such as a visual presentation, an audio presentation, a spoken presentation, a tactile presentation, and a combination of two or more of the foregoing presentation modes. In another embodiment, the assistance file includes operability to provide interactive assistance with additional user inputs being received through the camera user interfaces 320.

An alternative embodiment implements the query operation 220 in two parts as described in conjunction with FIG. 4.

Activation of the assistance manager transitions the user interfaces 320 to a first state. A detected subsequent user touch to another user interface of the plurality of user interfaces 320 may be received by the assistance manager as a received aspect selection operation 250, as described in conjunction with FIG. 4. On receiving the selection 250, the assistance manager transitions the user interfaces to a second state. A detected subsequent user touch to a user interface of the plurality of user interfaces 320 may be received as selection corresponding to an assistance request through the second user interface of the electronic device. For example, once the assistance manager transitions the user interfaces 320 to the second state, information may be displayed on the display 332 indicating assistance selections associated with the buttons 344A-344C. The buttons may be appropriately referenced by information displayed on the display 332, such as "show me," "demonstrate," and "guide me" respectively. A selection corresponding to an assistance request is received by the assistance manager as received selection corresponding to an assistance selection operation 260 as described in conjunction with FIG. 4.

In the above alternative environment, detection of a signal responsive to a sound or voice received by the microphone 334, the assistance selection operation 260 may be received by detection and recognition of a signal responsive to spoken commands received by the microphone, such as "show me," "demonstrate," and "guide me."

In operation of an embodiment, a user interested in receiving assistance related to the digital camera activates the assistance manager by a long touch to at least one interface of the plurality of interfaces 320. In this illustrative operation of an embodiment, the button 344D in a long-touch mode is designated as an assistance manager activation button. The assistance manager is activated in response to the button 344D receiving a long touch. The assistance manager transitions the buttons 344A-344E to a first state. The user inputs the selection corresponding to an aspect of the digital camera 310 by touching an interface associated with the aspect. For example, a user touch may be received at button 344E, the shutter button, by an interface normally associated with the shutter button. Because the assistance manager has been activated and the buttons are in a first state, the touch to the button 344E is received as an-input selection corresponding to an aspect of the digital camera, the shutter button. The assistance manager then transitions the buttons 344A-344E to a second state and displays a plurality of assistance requests which are visually associated with the buttons 344A-344C. The buttons 344A-344C may be appropriately reference by information displayed on the display 332, such as "show me," "demonstrate," and "guide me" respectively. The association may be by lead lines indicating a visual association between a respective word and their respective button. A user touch to one of the buttons 344A-344C is received by the assistance manager as a selection corresponding to an assistance request. For example, if the button 344A is visually associated with "demonstrate," a user touch detected at an interface associated with button 344A is received as a selection corresponding to an assistance request for a demonstration of the shutter button.

In an alternative embodiment, voice commands may be used to implement part or all of the operation 200 that provides assistance. Selections and inputs may be received from signals responsive to sounds and words detected by the microphone 334 and recognized. For example, the activation of the assistance manager program, the selection corresponding to an aspect of the digital camera 310, and the assistance request, may occur in response to a received sound, spoken word, and/or a spoken phrase. For example, a user may say "assistance manager" to activate the assistance manager, say "shutter button" as a selection corresponding to an aspect of the digital camera, and say "demonstration" as a selection corresponding to an assistance request.

The assistance manager searches the assistance file saved in the system memory of the thin computing device included in the digital camera 310 for an assistance correlating with the user-selected query for a demonstration of the shutter button. An assistance is provided corresponding to the query through at least one interface of the plurality of interfaces 320.

The digital camera 310 provides assistance correlating to the user query through the user interfaces 320 of the digital camera. For example, the assistance may include providing in the display 332 a demonstrative visual presentation of the functions and capability of the shutter button 344E. The assistance may further include flashing the light emitter (not shown) associated with the shutter button 344E as appropriate to indicate when the shutter button should be pressed. The assistance may also provide a voice track through the speaker 338, the voice track may be coordinated with the visual presentation in the display 332 and flashing the light emitter associated with the shutter button 344E.

Figure 7:
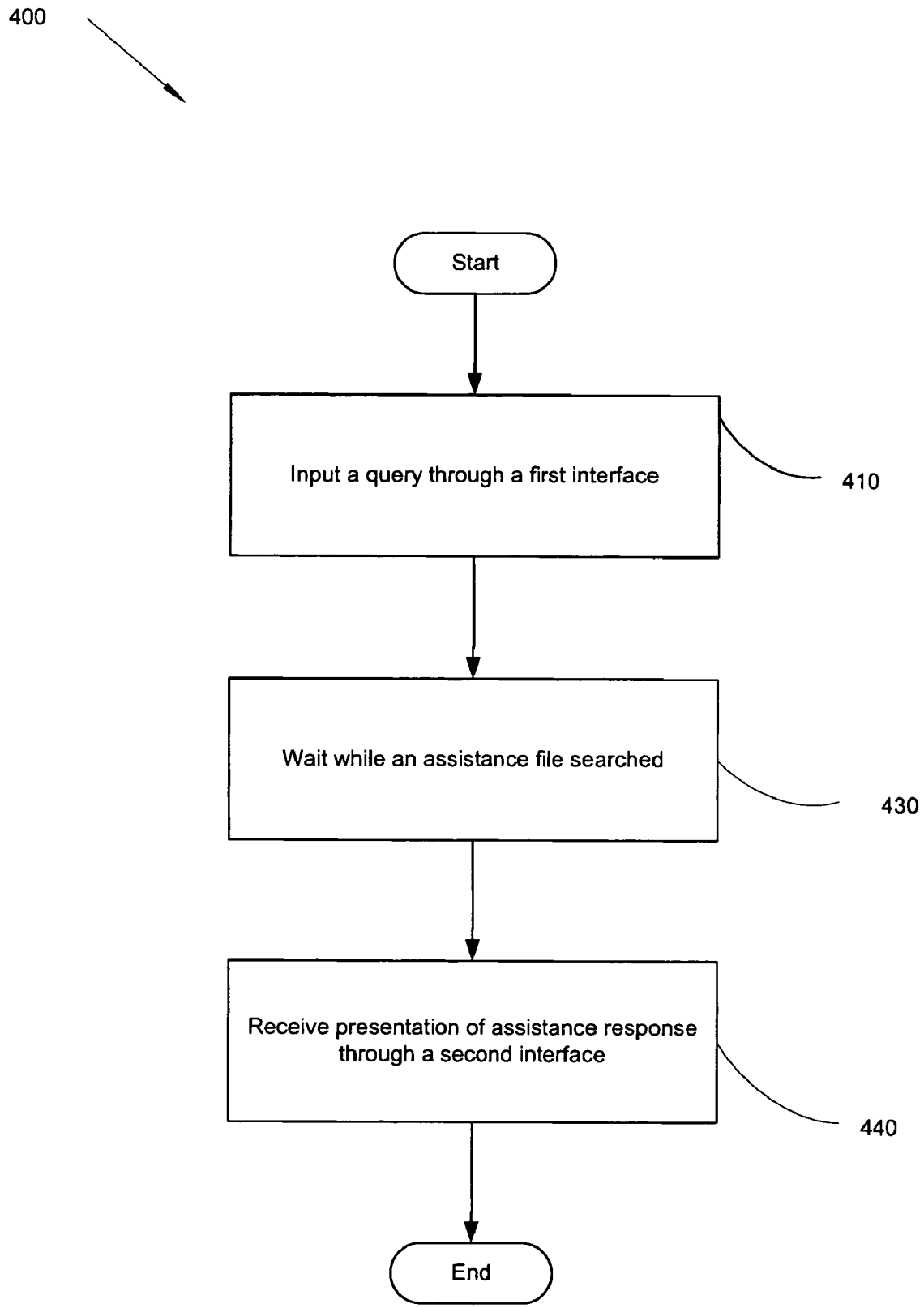
FIG. 7 is a flow diagram illustrating an exemplary operation that receives an assistance presentation.

FIG. 7 is a flow diagram illustrating an exemplary operation 400 that receives an assistance presentation. After a start operation, the operation moves to an input operation 410. At the input operation 410, a query related to an aspect of an electronic device is inputted through a first interface of the electronic device. The query may typically be inputted by a human user. At wait operation 430, the inputter waits while an assistance file is searched for an assistance response correlating to the input operation 410. At receive assistance operation 440, a presentation of the assistance response correlating to the query is received through a third interface of the electronic device.

At least one of the first and second interfaces may be user interfaces, and the first and second interfaces may be at least substantially similar. In an embodiment, and similar to the embodiment of the exemplary operation 200 that provides an assistance described in conjunction with FIG. 3, the first interface and the second interface may comprise a same physical or virtual device. The first and second interfaces may share a same physical or a same virtual device, but be separately activatable when the physical or virtual device is in a different activating mode or state.

Figure 8:
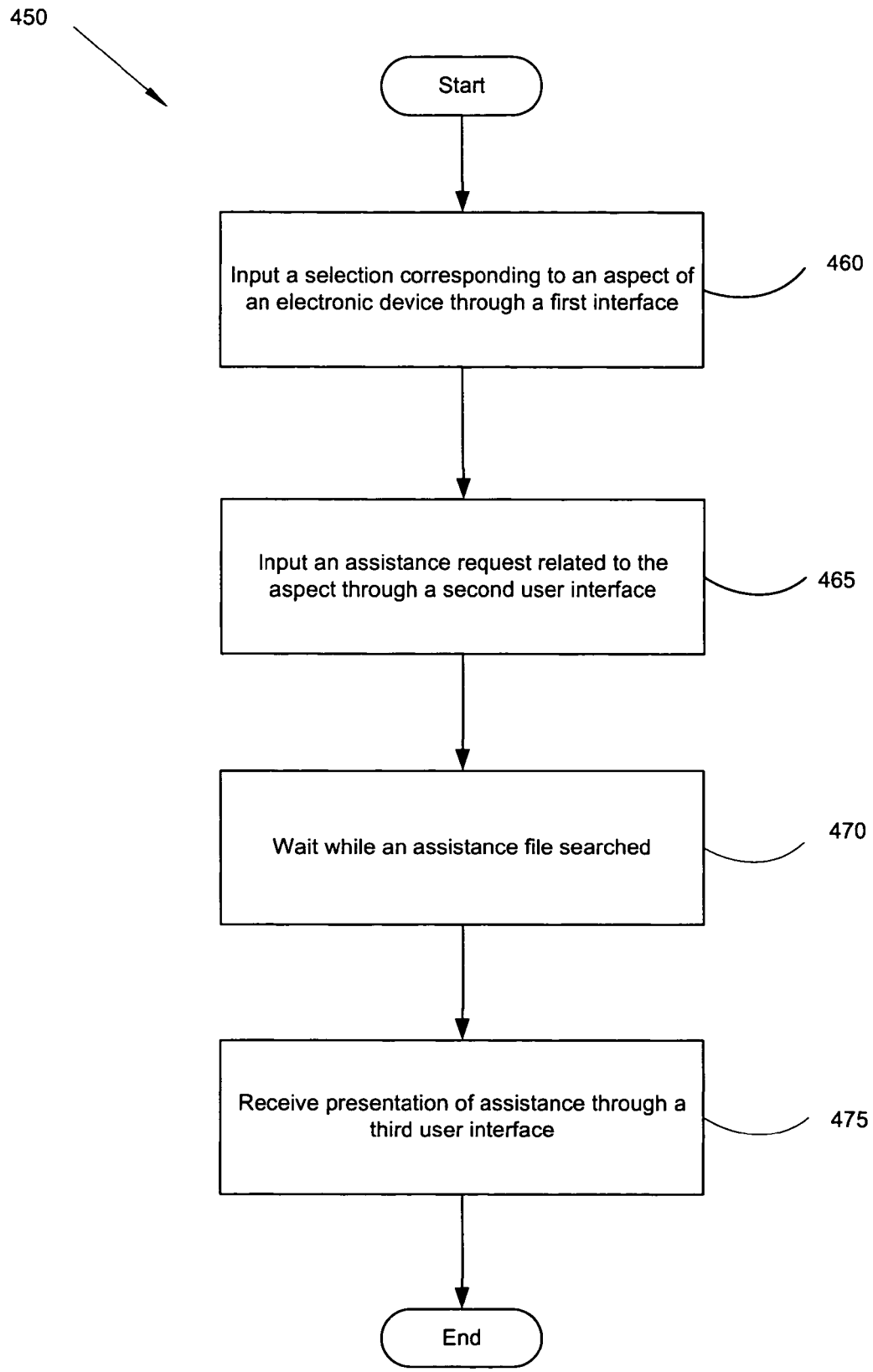
FIG. 8 is a flow diagram illustrating an exemplary operation that receives an assistance presentation.

FIG. 8 is a flow diagram illustrating an exemplary operation 450 that receives an assistance presentation. After a start operation, the operation moves to a selection operation 460. At selection operation 460, a selection corresponding an aspect of an electronic device is inputted through a first user interface associated with the electronic device. At request operation 465, an assistance request related to the aspect is inputted through a second user interface associated with the electronic device. The selection and request may typically be inputted by a human user. At wait operation 470, the inputter waits while an assistance file is searched for the assistance presentation correlating to the assistance request. At receive assistance operation 475, an assistance presentation correlating to the assistance request is received through a third user interface associated with the electronic device. The exemplary operation 450 then proceeds to an end operation.

Figure 9:
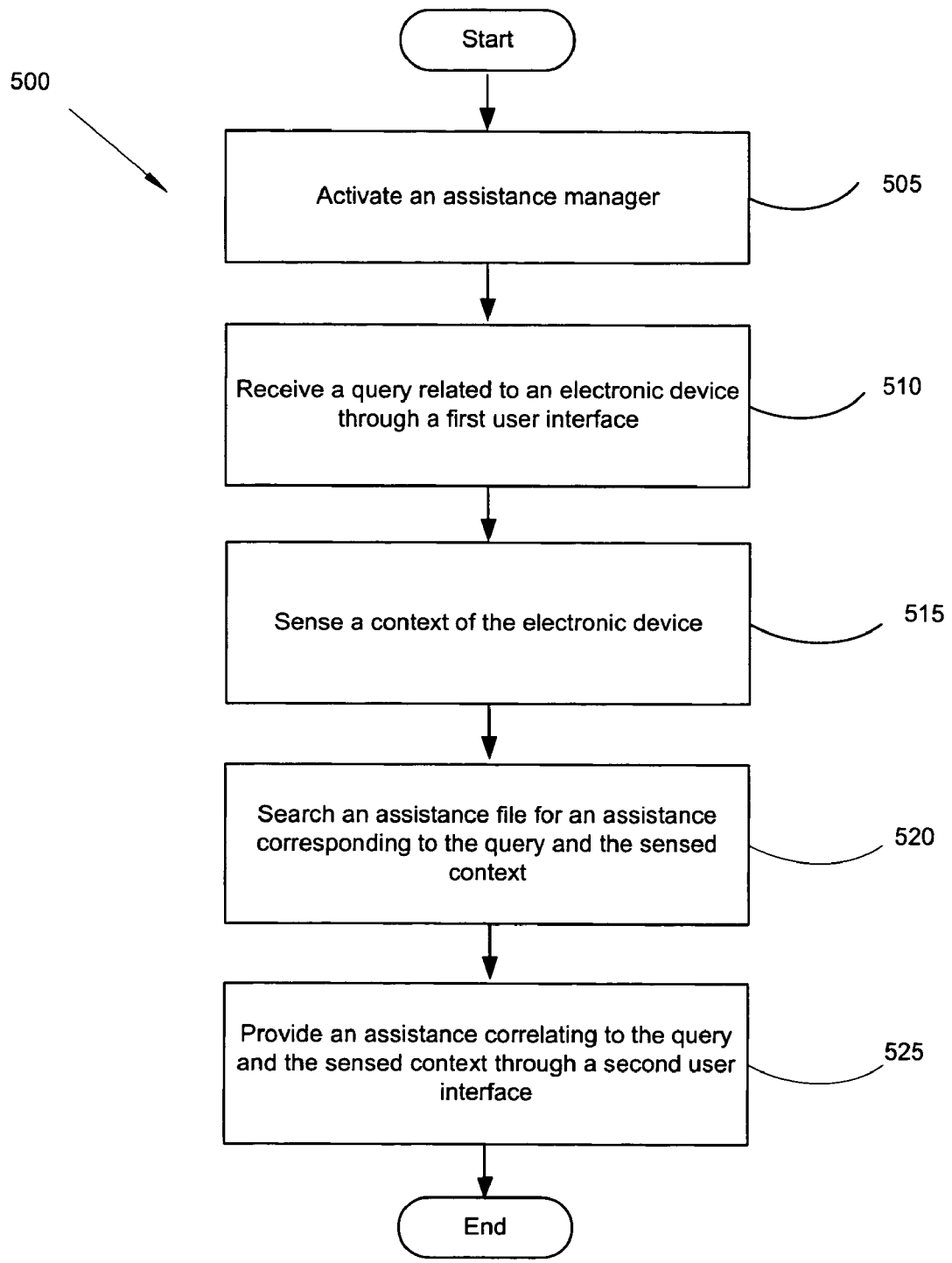
FIG. 9 is a flow diagram illustrating an exemplary operation that provides contextual assistance.

FIG. 9 is a flow diagram illustrating an exemplary operation 500 that provides contextual assistance. After a start operation, the operation moves to a help activation operation 505. At help activation operation 505, an assistance manager is activated. The assistance manager may include a circuit, a module, and/or instructions, such as computer-readable instructions, for example, a program, process, and/or application operating on an electronic device, that implement the exemplary operation 500 that provides assistance.

At query receive operation 510, a query related to an electronic device is received through a first user interface associated with the electronic device. In an embodiment, the first user interface may include a first user interface associated with an aspect of the electronic device. The association may include any form of association with the aspect of the electronic device, such as, for example, a physical association and a virtual association.

In a further embodiment, the first user interface may include a button. The button may include anything that accepts a user input expression. For example, the button may include a tangible button, and a virtual button. By way of further example, the receiving a selection of an aspect of the electronic device through a first user interface associated with the electronic device may include detecting a touch through a first user interface associated with the electronic device.

The query may be received in any manner through the first user interface. For example, the query may be received by detecting a touch to the first user interface, by detecting a sound through the first user interface, and/or by detecting a spoken word. The electronic device may include any type of electronic device. For example, an electronic device may include a computing device, a pervasive computing device, a limited resource computing device, and/or an electrical appliance. The query may include a query related to an aspect of the electronic device.

At context operation 515, a context of the electronic device is sensed. The sensed context may include any contextual parameter related to the electronic device. For example, the sensed context may include sensing a context extrinsic to the electronic device, an environment extrinsic to the electronic device, and/or a context intrinsic to the electronic device. The intrinsic context may include any intrinsic context or state of the electronic device. For example, sensing a context intrinsic to the electronic device may include sensing a configuration context, a software context intrinsic to the electronic device, and/or a hardware context.

The query receive operation 510 may include receiving a query related to an electronic device and a sensed context of the electronic device. For example, a query may include a request for assistance correlating to taking a portrait where a sensed context at context operation 515 includes a sensed mountain background context.

At search operation 520, an assistance file is searched for an assistance correlating with the query and the sensed context. The assistance file may have any association with the electronic device. For example, the assistance file may be saved in a storage physically incorporated in the electronic device, a storage local to the electronic device, and saved in a storage accessible to the electronic device over a network.

At broadcast operation 525, an assistance correlating to the query and the sensed context is provided through a second user interface associated with the electronic device. The provided assistance may be any assistance correlating to both the query and the sensed context. For example, the provided assistance may include a guided response assistance, an interactive tutorial assistance, an assistance corresponding with a physical element of the electronic device, a guidance corresponding with a process associated with the electronic device, showing how an aspect of the device works, and/or a description of an aspect of the electronic device. The provided assistance may be presented in any manner through the second user interface. For example, the provided assistance may include visually providing an assistance, such as blinking a light emitter associated with a physical element of the electronic device, or displaying text, graphics or pictures on a visual display associated with the electronic device. Further, the provided assistance may include audibly providing an assistance, such as a spoken assistance, and/or tactilely providing an assistance, such as by vibrating a physical element of the electronic device.

In an embodiment, the first user interface may include an element of the electronic device in a first state and the second user interface may include the element of the electronic device in a second state. In an alternative embodiment, the first user interface may include an element of the electronic device in a first mode and the second user interface may include the element of the electronic device in a second mode. The second user interface may include the first user interface.

The operation 500 then proceeds to an end operation.

In an embodiment, the exemplary operation 500 that provides contextual assistance may be considered to be an electronic device assistance manager. The assistance manager may be implemented in any combination of hardware, software, and/or firmware configured to effect the operation 500 that provides assistance, depending upon the design choices of the system designer. A further embodiment includes a computer-readable media containing computer instructions which, when run on a computing device, cause the computing device to perform the operation 500 that provides assistance. The computer-readable media may include a computer storage media, which may be carried by a computer-readable carrier, such as a floppy disk. Alternatively, the computer-readable media may include a communications media.

The exemplary operation 500 that provides contextual assistance may be implemented in any device or item where enhanced contextual user assistance may be advantageously employed. For example, the exemplary operation 500 may be implemented in the system 300 described in conjunction with FIG. 6. The digital camera 310 of the system 300 includes context sensors 350, which are illustrated as the temperature sensor 352 and the light intensity sensor 354. In this example, the assistance manager includes operability to implement the exemplary operation 500. Continuing with the operational example described in conjunction with FIG. 6, a user interested in receiving assistance activates the assistance manager at help activation operation 505 by a long touch to the button 344D.

At query receive operation 510, the assistance manager operates in a manner similar to that described in conjunction with FIG. 6 for query operation 220 where a touch to the shutter button 344E is detected as a query. At context operation 515, the assistance manager operates to sense a context of the electronic device. In this example, the context is sensed through the external temperature sensor 352 and the light intensity sensor 354. If for example, the context of the digital camera 310 is a snowy environment on a sunny day, the external temperature sensor 352 would sense temperatures at or below freezing, and the light intensity sensor 354 would sense strong sunlight. By way of further example, if the context of the digital camera 310 is a tropical beach, the external temperature sensor 352 would sense a warm temperature and the light sensor 354 would sense bright sunlight. In another example, if the context of the digital camera 310 was indoors under incandescent lighting, the external temperature sensor 352 would sense a room temperature and the light sensor 354 would sense a light frequency pattern correlating to incandescent lighting.

At the search operation 520, the assistance manager searches an assistance file for an assistance correlating to both the query related to the user selected shutter button 344E and the sensed context. Using the above example where the digital camera is in a snowy environment on a sunny day, the assistance manager program may search an assistance file for a user assistance correlating to selecting shutter speeds used in a bright sunlight and cold temperature environment.

At the broadcast operation 525, the assistance manager provides a user assistance correlating to the query and the sensed context through a second user interface of the digital camera 310. Using the above example of the snow scene, the provided assistance may include recommending a fast shutter speed. The provided assistance may include a recommendation to protect the camera lens from fogging in the cold environment. The second user interface may include any user interface associated with the electronic device, and may include a combination of two or more user interfaces. For example, in an embodiment, the second user interface includes a visual display. The visual display may include a visual display surface, such an liquid crystal display, and/or may include a light emitter, such as small light emitting diode incorporated in a physical button.

In a further embodiment, the query receive operation 510 may include receiving a query related to an electronic device and a sensed context of the electronic device. A context sensor may include a program operable to recognize certain extrinsic environments from images acquired through a lens of the digital camera 310. The assistance manage may receive an user query requesting assistance in taking a portrait in a context of "this background," and receive an image of "this background" resulting from the user capturing an image of "this background" through the lens of the digital camera 310. At the context operation 515, a recognition aspect of the assistance manager determines the context of "this background" from the user captured image. For example, if the recognition aspect of the assistance manager determines includes a mountain background, 515 includes a sensed mountain background context. Continuing with this embodiment, at the search operation 520, the assistance manager searches an assistance file for an assistance correlating to both the query related to the user selected shutter button 344E and the sensed extrinsic context acquired in response to a user action in capturing "this background" through the digital camera 310.

Figure 10:
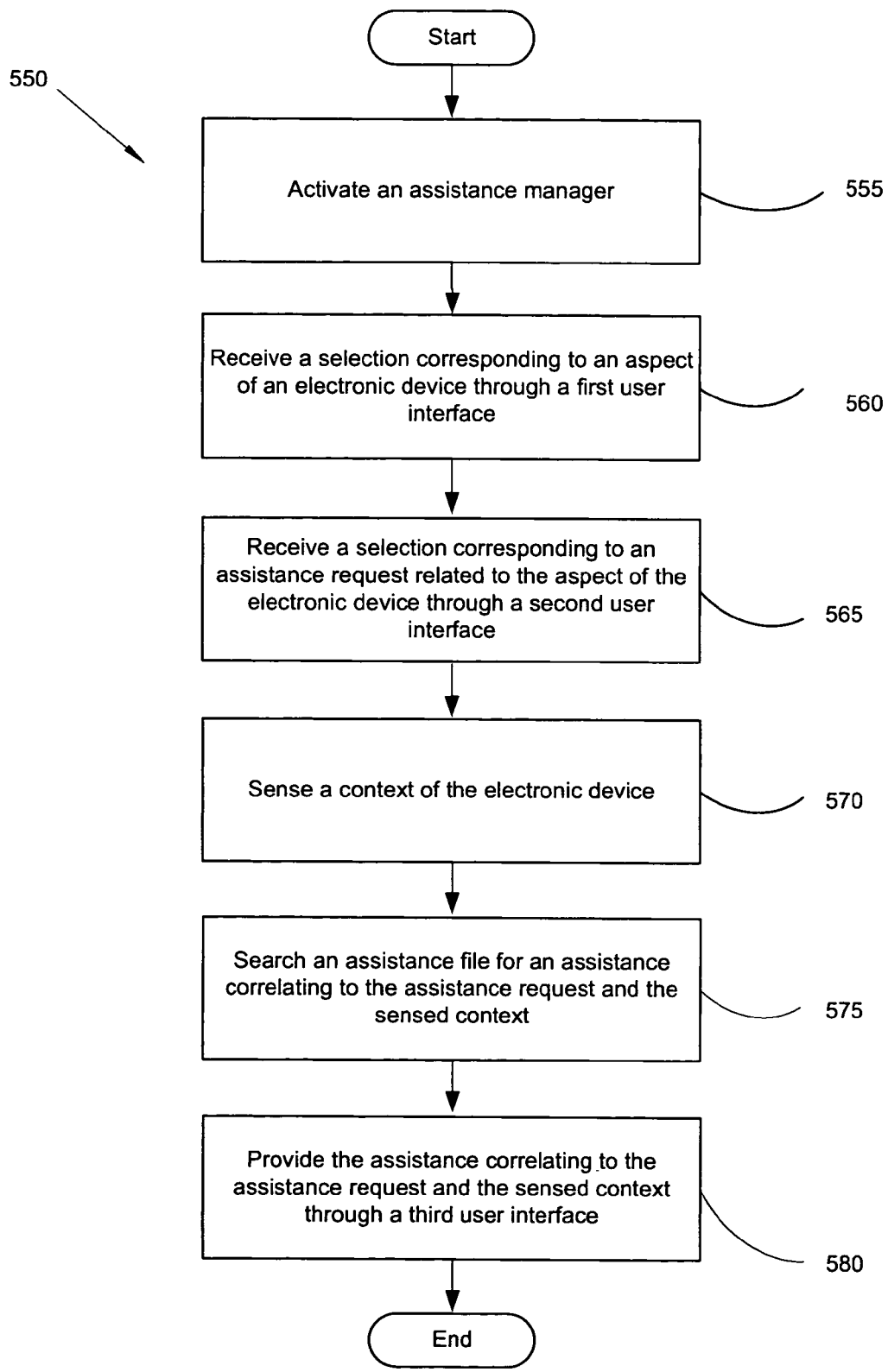
FIG. 10 is a flow diagram illustrating another exemplary operation that provides contextual assistance.

FIG. 10 is a flow diagram illustrating an exemplary operation 550 that provides contextual assistance. After a start operation, the operation moves to a help activation operation 555, where an assistance manager is activated. The assistance manager may include a circuit, a module, and/or instructions, such as computer-readable instructions, for example, a program, process, and/or application operating on an electronic device, that implement the exemplary operation 550 that provides assistance. At designation operation 560, a selection corresponding to an aspect of an electronic device is received through a first user interface of the electronic device. In an embodiment, the first user interface of the electronic device associated with the aspect. The selection corresponding to an aspect of an electronic device may be received through the first user interface in any manner. For example, the selection may be received by detecting a touch to the first user interface, and/or by detecting a sound through the first user interface, which may include detecting a spoken word.

At request operation 565, a selection corresponding to an assistance request related to the aspect of the electronic device is received through a second user interface of the electronic device. The first user interface and/or the second user interfaces may generally include any of the configurations previously described. Several exemplary configurations are described in conjunction with the exemplary operation 550 that provides assistance. The receiving a selection corresponding to an assistance request through a second user interface may generally be received in any manner, including any manner previously described that receives a selection through a user interface. In an alternative embodiment, the selection may include a selection corresponding to a predetermined assistance request related to the aspect of the electronic device. For example, predetermined assistance requests may include any request related to the electronic device, such as a group of "show me," "demonstrate," and "guide me." In this alternative embodiment, at request operation 565, a user selects at least one from among a group of predetermined assistance requests.

At context operation 570, a context of the electronic device is sensed. The context operation 570 may be substantially similar to the context operation 515 of the exemplary process 500 that provides an assistance described in conjunction with FIG. 9. At search operation 575, an assistance file is searched for an assistance correlating to the selection corresponding to an assistance request and the sensed context. The search operation 575 may be substantially similar to the search operation 520 of the exemplary process 500 that provides an assistance described in conjunction with FIG. 9.

At broadcast operation 580, the assistance correlating to the assistance request related to the aspect of the electronic device and the environmental context is provided through a third user interface of the electronic device. The broadcast operation 580 may be substantially similar to the help operation 525 of the exemplary process 500 that provides an assistance described in conjunction with FIG. 9. The three user interfaces may be related in any suitable, selected manner. For example, in an embodiment the first user interface includes an element of the electronic device in a first state, and the second user interface includes the element of the electronic device in a second state. In another embodiment, the first user interface includes an element of the electronic device in a first state, the second user interface includes the element of the electronic device in a second state, and the third user interface includes the element of the electronic device in a third state. In a further embodiment, one of the first user interface, the second user interface, and the third user interface includes an element of the electronic device in a first state, and another of the first user interface, the second user interface, and the third user interface include the element of the electronic device in a second state. In an embodiment, the first user interface includes an element of the electronic device in a first mode and the second user interface includes the element of the electronic device in a second mode. In another embodiment, the first user interface includes an element of the electronic device in a first mode, the second user interface includes the element of the electronic device in a second mode, and the third user interface includes the element of the electronic device in a third mode. In a further embodiment, one of the first user interface, the second user interface, and the third user interface include an element of the electronic device in a first mode, and another of the first user interface, the second user interface, and the third user interface include the element of the electronic device in a second mode.

In an alternative embodiment, the exemplary operation 550 that provides assistance further includes the exemplary operation 270, which provides additional assistance as described in conjunction with FIG. 3.

In an embodiment, the exemplary operation 550 that provides contextual assistance may be considered to be an electronic device assistance manager. The assistance manager may be implemented in any combination of hardware, software, and/or firmware configured to effect the operation 550 that provides assistance, depending upon the design choices of the system designer. A further embodiment includes a computer-readable media containing computer instructions which, when run on a computing device, cause the computing device to perform the operation 550 that provides assistance. The computer-readable media may include a computer storage media, which may be carried by a computer-readable carrier, such as a floppy disk. Alternatively, the computer-readable media may include a communications media.

The exemplary operation 550 that provides contextual assistance may be implemented in any device or item where enhanced contextual user assistance may be advantageously employed. For example, the exemplary operation 550 may be implemented in the system 300 described in conjunction with FIGS. 6 and 9.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, and/or examples. Insofar as such block diagrams, operation diagrams, flowcharts, and/or examples contain one or more functions and/or operations, it will be understood by those within the art that each function and/or operation within such block diagrams, operation diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

What is claimed is:

1. A method comprising:
   (a) receiving a query including a selection of an aspect of an electronic device through a first user interface associated with the electronic device;
   (b) sensing a context of the electronic device; and
   (c) providing an assistance correlating to the query and the sensed context through a second user interface associated with the electronic device,
   wherein the first user interface includes an element of the electronic device in a first state and the second user interface includes the element of the electronic device in a second state.

2. The method of claim 1, wherein the receiving a query including a selection of an aspect of the electronic device through a first user interface associated with the electronic device includes receiving a selection of an aspect of the electronic device through a first user interface associated with the aspect of the electronic device.

3. The method of claim 1, wherein the receiving a query including a selection of an aspect of an electronic device through a first user interface associated with the electronic device includes detecting a touch through a first user interface associated with the electronic device.

4. The method of claim 1, wherein the receiving a query including a selection of an aspect of an electronic device through a first user interface includes receiving a selection corresponding to an assistance request.

5. The method of claim 1, wherein the receiving a query including a selection of an aspect of the electronic device through a first user interface includes detecting a touch to the first user interface.

6. The method of claim 1, wherein the receiving a query through a first user interface includes detecting a sound through the first user interface.

7. The method of claim 6, wherein the detecting a sound includes detecting a spoken word.

8. The method of claim 1, wherein the electronic device includes a computing device and the receiving a query including a selection of an aspect of the electronic device includes receiving a query including a selection of an aspect of the computing device.

9. The method of claim 1, wherein the electronic device includes an electrical appliance and the receiving a query including a selection of an aspect of the electronic device includes receiving a query including a selection of an aspect of the electrical appliance.

10. The method of claim 1, wherein the electronic device includes a limited resource computing device and the receiving a query including a selection of an aspect of the electronic device includes receiving a query including a selection of an aspect of the limited resource computing device.

11. The method of claim 1, wherein the electronic device includes a pervasive computing device and the receiving a query including a selection of an aspect of the electronic device includes receiving a query including a selection of an aspect of the pervasive computing device.

12. The method of claim 1, wherein the providing an assistance includes providing a user assistance.

13. The method of claim 1, wherein the providing an assistance includes visually providing an assistance.

14. The method of claim 1, wherein the providing an assistance includes audibly providing an assistance.

15. The method of claim 1, wherein the providing an assistance includes providing a spoken assistance.

16. The method of claim 1, wherein the providing an assistance includes tactilely providing an assistance.

17. The method of claim 1, wherein the providing an assistance includes providing a guided response assistance.

18. The method of claim 1, wherein the providing an assistance includes providing an interactive tutorial assistance.

19. The method of claim 1, wherein the providing an assistance includes providing a guidance corresponding with a process associated with the electronic device.

20. The method of claim 1, wherein the providing an assistance includes providing a description of the electronic device.

21. The method of claim 1, wherein the providing an assistance includes providing an assistance showing how an aspect of the device works.

22. The method of claim 1, wherein the providing an assistance through a second user interface associated with the electronic device includes providing an assistance through a physical element of the electronic device.

23. The method of claim 22, wherein providing an assistance through a physical element of the electronic device includes providing an assistance by blinking a light associated with a physical element of the electronic device.

24. The method of claim 1, further comprising:
   (d) searching an assistance file for an assistance correlating with the query and the sensed context.

25. The method of claim 1, wherein the receiving a query including a selection of an aspect of an electronic device includes receiving a query including a selection of an aspect of an electronic device and a sensed context of the electronic device.

26. A method comprising:
   (a) receiving a query including a selection of an aspect of an electronic device through a first user interface associated with the electronic device;
   (b) sensing a context of the electronic device; and
   (c) providing an assistance correlating to the query and the sensed context through a second user interface associated with the electronic device,
   wherein the first user interface includes an element of the electronic device in a first mode and the second user interface includes the element of the electronic device in a second mode.

27. A method comprising:
(a) receiving a query including a selection of an aspect of an electronic device through a first user interface associated with the electronic device;
(b) sensing a context of the electronic device; and
(c) providing an assistance correlating to the query and the sensed context through a second user interface associated with the electronic device,
wherein the sensing a context of the electronic device includes sensing a context extrinsic to the electronic device.

28. The method of claim 27, wherein the sensing a context of the electronic device includes sensing a context intrinsic to the electronic device.

29. The method of claim 28, wherein the sensing a context intrinsic to the electronic device includes sensing a configuration context intrinsic to the electronic device.

30. The method of claim 28, wherein the sensing a context intrinsic to the electronic device includes sensing a software context intrinsic to the electronic device.

31. The method of claim 28, wherein the sensing a context intrinsic to the electronic device includes sensing a hardware context intrinsic to the electronic device.

32. A method comprising:
(a) receiving a query including a selection of an aspect of an electronic device through a first user interface associated with the electronic device;
(b) sensing a context of the electronic device; and
(c) providing an assistance correlating to the query and the sensed context through a second user interface associated with the electronic device,
wherein the sensing a context of the electronic device includes sensing an environment extrinsic to the electronic device.

* * * * *